I. J. WARD.
DRAG.
APPLICATION FILED JAN. 23, 1912.
1,061,709.
Patented May 13, 1913.
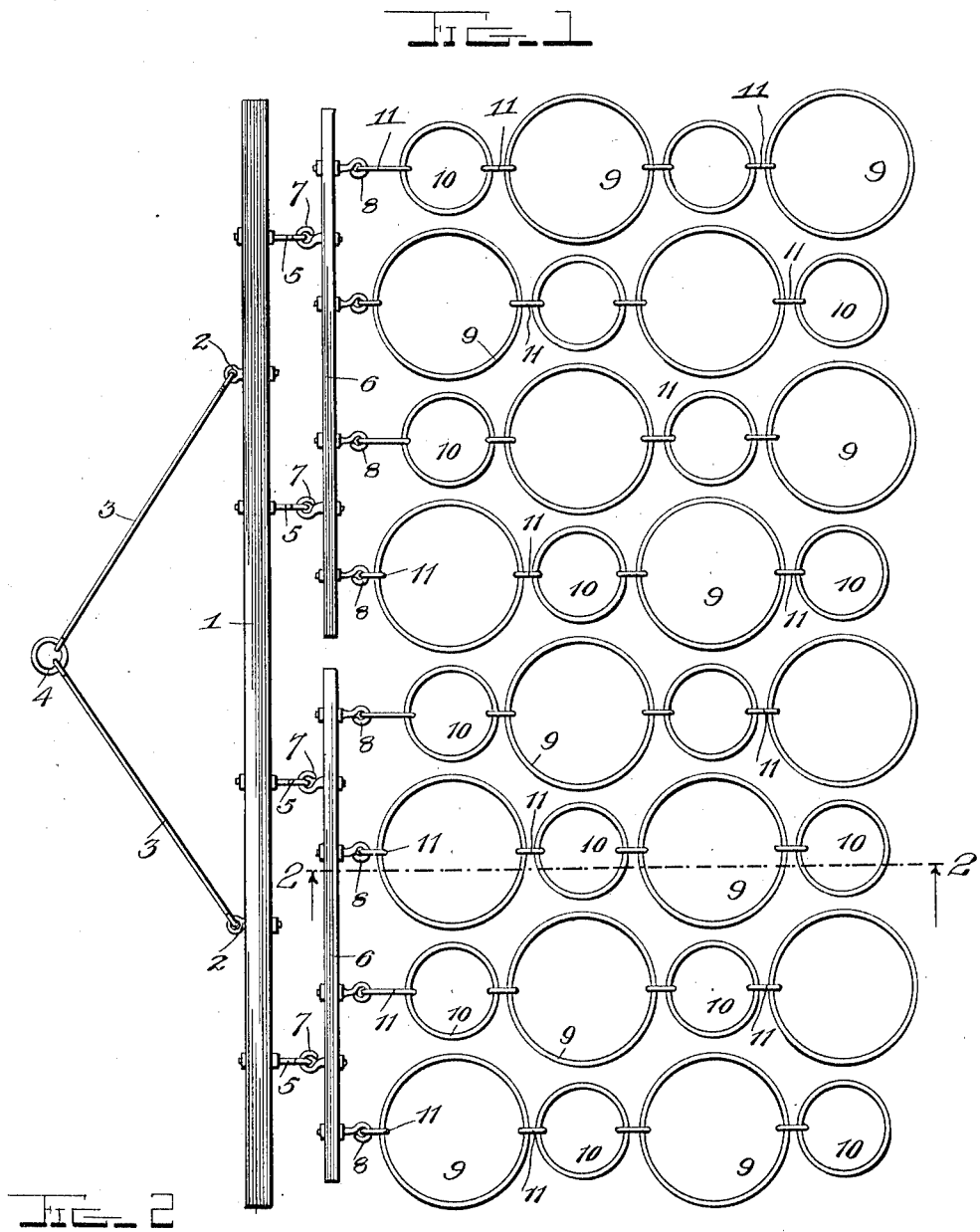
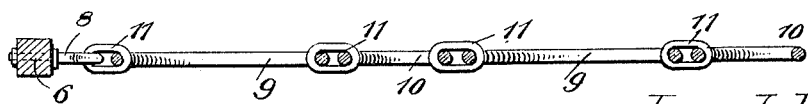
Witnesses
Inventor
Ira J. Ward
By George W. Sues.
Attorney

UNITED STATES PATENT OFFICE.

IRA J. WARD, OF ANGORA, OKLAHOMA.

DRAG.

1,061,709. Specification of Letters Patent. Patented May 13, 1913.

Application filed January 23, 1912. Serial No. 672,833.

*To all whom it may concern:*

Be it known that I, IRA J. WARD, a citizen of the United States, and a resident of Angora, in the county of Roger Mills and State of Oklahoma, have invented certain new and useful Improvements in Drags, of which the following is a specification, reference being had to the accompanying drawings.

My invention relates to improvements in drags or devices for pulverizing and smoothing the soil.

One object of the invention is to provide a drag having an improved construction and arrangement of pulverizing and smoothing elements, which when drawn over the ground will effectually level or smooth and pulverize the soil.

Another object is to provide a device of this character which will be of lighter draft, less expensive and for many purposes more efficient than a harrow.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1, is a plan view of my improved drag. Fig. 2, is an enlarged detail sectional view taken on the line 2, 2, of Fig. 1.

My improved drag comprises a draft bar 1, which may be of any suitable length and constructed of wood or metal. Connected at their inner ends to eyebolts 2, in the bar 1, are draft rods 3, the forward ends of which are connected to a ring 4, to which the draft animals are hitched in any suitable manner. In the bar 1, at substantially equal distances from the eyebolts 2, are arranged eyebolts 5, to which are connected drag beams 6, said beams being loosely attached to the eyebolts 5, by similar bolts 7. The beams 6, may also be formed of wood or metal. Arranged at suitable intervals in the beams 6, are eyebolts 8, to which are connected chains of rings each of the chains being formed of a plurality of large rings 9 and small rings 10, connected together by short links 11, and are free to turn therein, which action tends to remove accumulations of dirt or trash from the rings, the drag being thus to a certain extent self cleaning.

While I have herein shown and described the draft bars 1, as having two sets or sections of drag elements, it is obvious that the bar may be of such length as to contain any desired number of sections. It will also be obvious that the drag beams may contain any desired number of rings.

In operation, when the drag is drawn over the ground, the soil is gathered by the front row of rings and is worked around the side and between the same to the rings behind and by these is pushed back and forth, thereby leveling and thoroughly pulverizing the soil.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my said invention, what I claim as new and desire to secure by United States Letters Patent is:

1. A drag comprising a plurality of rings of different sizes, said rings being secured together to form a series of chains, the rings of one size alternating with the rings of another size in the chains, and the rings of one size in the chains being disposed opposite to rings of another size in the adjoining chains, a draft mechanism, and means to connect the chains thereto.

2. A drag comprising a plurality of large and small rings, links to loosely connect said rings together to form chains, said large and small rings being alternately arranged in the chains and adapted to turn in the links, a draft bar, and beams connected to said bar and to the forward ends of the chains of rings.

In testimony whereof I affix my signature, in presence of two witnesses.

IRA J. WARD.

Witnesses:
J. T. GARWOOD,
J. H. WAGNER.

Copies of this patent may be obtained for five cents each, by addressing the "Commissioner of Patents, Washington, D. C."